Patented Dec. 14, 1926.

1,611,001

UNITED STATES PATENT OFFICE.

CHARLES FREDERICK CROSS, OF LONDON, ENGLAND.

TREATMENT OF CELLULOSE HYDRATE.

No Drawing. Application filed May 4, 1925, Serial No. 28,027, and in Great Britain May 12, 1924.

Through the plastic condition of cellulose converted into derivative soluble forms such as viscose (cellulose xanthates) or by treatment with cuprammonium zinc chloride, or other solvent of cellulose, various products are obtained, such as artificial silk and filaments, plane films in short or continuous lengths, and solids of any dimensions (viscoid). The water soluble derivatives whether treated in the form of solution or the more concentrated forms in which they require to be treated by milling machinery are ultimately obtained as cellulose in the solid form, and more or less structureless.

In arriving at this condition they pass from the highly hydrated state of the soluble derivatives through various processes of dehydration to the ultimate air-dry condition in which they retain about 10 per cent of moisture.

In certain industries it is of importance to preserve the hydrated form or condition and especially in such a way as to conserve the dimensions of the hydrate.

The control of dimensions or prevention of shrinkage has particular advantage in the case of manufacture of caps or thimbles for sealing bottles or like purposes. These caps require to be applied in the fully hydrated form so that they have been kept immersed in water or associated with water in special wrappings, until used.

In the case of artificial silk or other filaments prepared by drawing the solution of cellulose from fine orifices through solutions which have the effect of precipitating the cellulose (hydrates), no such treatments for retaining the hydrated form have been proposed, but such retention is of advantage in certain cases.

In the case of plane films prepared in continuous length, it has been proposed to incorporate a proportion of glycerin with the cellulose (hydrate) in the course of manufacture, but the proportions proposed are small, being designed only to prepare the ultimate air-dry product in a soft and flexible condition and to prevent undue drying or over-drying, which would cause a brittle condition and loss of tenacity.

The present invention takes advantage of the fact that glycerin used in the higher proportions specified displaces the water of hydration of the cellulose gel, entering into combination with the cellulose, and that in presence of relatively much water this action of the glycerin is enhanced by the presence of a deliquescent salt, particularly zinc chloride, which tends to remove water from the glycerin-cellulose compound and to make the latter more stable. If the cellulose hydrates in any of their usual derivative forms such as thimbles or caps, films in any form and threads or ribands be treated with these agents, the condition of hydration may be retained within wide limits, and being soluble in water the agents can be removed subsequently by washing, whereupon the passage from the hydrated to the air-dried condition can proceed. Any loss of dimensions from the original is reversed on washing.

As an example of a method of carrying out this invention, zinc chloride is dissolved in water and the solution is mixed with glycerin so that the mixture contains per 100 parts by weight Zinc chloride ($ZnCl_2$) _____ 22
Glycerin _____ 22
Water _____ 56

The solution is applied in any convenient way. In the case of a continuous length of film or thread, this may be passed through a bath prepared as above. In the case of bottle caps, films in short lengths, skeins of artificial silk, these may be immersed in a bath prepared as above. After immersion for a time required for penetration of the mass, the solution is removed from the latter such as by draining and subsequent centrifuging. After this treatment and exposure to the air the products lose water until they attain the state of equilibrium with the atmospheric moisture. In this condition they are relatively dry to the touch; there is no actual liquid or wetness. The products may be preserved in this form for any time required; thus, bottle caps so treated may be distributed to consumers and skeins of thread, filament or riband may be preserved so that they may be used in this condition, as for instance in weaving, to be afterwards treated with water for the removal of the soluble matters. After removal of these the hydrate behaves as freshly prepared hydrate, incidentally resuming dimensions, and then on exposure parts with its water and shrinks in dimensions. This shrinkage is taken advantage of in known manner in the case of bottle caps. In the case of artificial silk, the fabrics after weaving, or yarns after twisting with other yarns or filaments will then shrink by exposure to the air, and in the case of union fabrics or mixed yarns in such a way as to produce effects of crêping.

The degree of hydration retained and consequent potential shrinkage of the cellulose can be modified by varying the strength of the solution with which the hydrated cellulose is treated and by varying the proportion to each other of the constituents of the solution.

In view of the sensitiveness of cellulose to acids it is necessary that the zinc chloride should have the normal ratio of components. Any mineral acidity, however, such as that of commercial zinc chloride, may be corrected by neutralization with a base, or by substitution of an organic acid for the mineral acid, such as by adding a proportion of zinc acetate in excess of the equivalent of such free acid with the chloride in solution.

In place of zinc chloride, I may use calcium or magnesium chloride similarly dissolved and mixed with glycerin, and if necessary with calcium or magnesium acetate to react with free acid. With variable proportions of the metallic salt and of glycerin, and of either or both in relation to the solvent water, a large range of desirable effects, as specified, may be controlled.

Good results have been obtained with variation between the limits 15-30 parts of the salt, 30-15 parts of glycerin and 40-70 parts of water.

It is not essential that the treatment should be applied immediately after the cellulose hydrate has been prepared. Thus, bottle caps removed from the solution in which they are washed after having been formed, may be drained and left in the air for, say, 2 or 3 days at ordinary temperatures before the treatment is applied.

Having thus described the nature of the said invention and the best means I know of carrying the same into practical effect, I claim:—

1. The method of preventing or controlling the shrinkage of hydrated celluloses when they pass from the hydrated to the air-dry form, which consists in displacing water of hydration of the hydrated cellulose by glycerin and incorporating the material with one or more soluble and deliquescent salts adapted to be removed subsequently by washing.

2. A treatment of hydrated celluloses which consists in incorporating with them a solution of zinc chloride in diluted glycerin.

3. A process of preserving in hydrated condition bottle caps made from hydrated cellulose by impregnating them with a solution of zinc chloride in diluted glycerin.

4. A treatment of hydrated celluloses, which consists in incorporating with them a solution of zinc chloride in diluted glycerin, which solution contains no free mineral acid.

5. A treatment of hydrated celluloses, which consists in treating a solution of zinc chloride in diluted glycerin with an agent capable of binding free mineral acid, and incorporating with the hydrated celluloses the treated solution.

6. A treatment of hydrated celluloses, which consists in incorporating with them a solution of zinc chloride in diluted glycerin, containing a salt of an organic acid.

7. A treatment of hydrated celluloses, which consists in adding to a solution of zinc chloride in diluted glycerin an organic salt in quantity in excess of that capable of binding free mineral acid in the solution, and incorporating with the hydrated celluloses the solution so obtained.

8. A process of preserving in hydrated condition bottle-caps made from hydrated cellulose, which consists in impregnating them with a solution of zinc chloride in diluted glycerin, which solution contains no free mineral acid.

9. A process of preserving in hydrated condition bottle-caps made from hydrated cellulose, which consists in treating a solution of zinc chloride in diluted glycerin with an agent capable of binding free mineral acid and impregnating the bottle-caps with the treated solution.

10. A process of preserving in hydrated condition bottle-caps made from hydrated cellulose, which consists in impregnating them with a solution of zinc chloride in diluted glycerin, containing a salt of an organic acid.

11. A process of preserving in hydrated condition bottle caps made from hydrated cellulose, which consists in adding to a solution of zinc chloride in diluted glycerin an organic salt in quantity in excess of that capable of binding free mineral acid in the solution and impregnating the bottle caps with the solution so obtained.

12. Cellulose hydrate which has incorporated in its glycerin and a deliquescent salt, is stable on exposure to the atmosphere and when treated with water reverts to the fully hydrated state and regains the properties of a freshly prepared cellulose hydrate.

13. Cellulose hydrate which has incorporated in it glycerin and zinc chloride, is stable on exposure to the atmosphere and when treated with water reverts to the fully hydrated state and regains the properties of a freshly prepared cellulose hydrate.

14. Bottle-caps consisting of cellulose hydrate which has incorporated in it glycerin and deliquescent salt, is stable on exposure to the atmosphere and when treated with water reverts to the fully hydrated state and retains the properties of a freshly prepared cellulose hydrate.

15. Bottle-caps consisting of cellulose hydrate which has incorporated in it glycerin and zinc chloride, is stable on exposure to the atmosphere and when treated with water reverts to the fully hydrated state and regains the properties of a freshly prepared cellulose hydrate.

In testimony whereof I have signed my name to this specification.

CHARLES FREDERICK CROSS.